Figure 1:
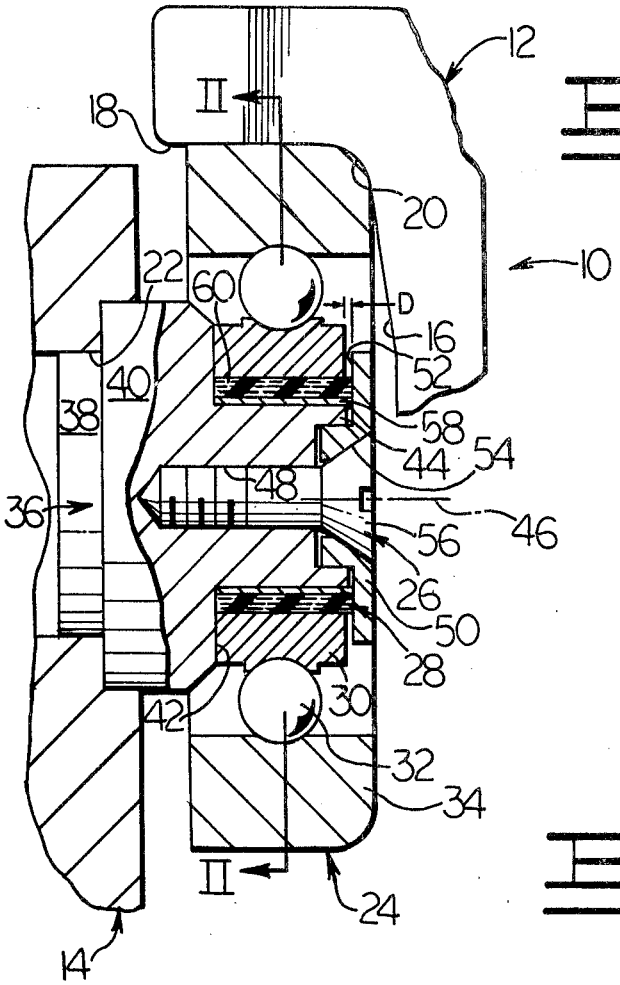
Figure 3:
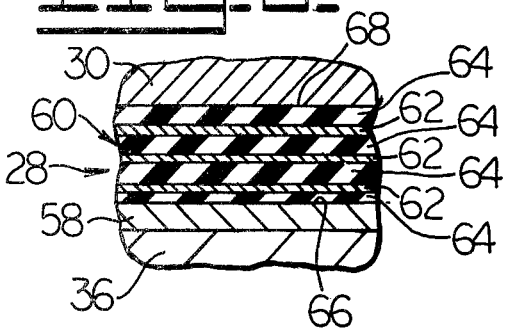
Figure 2:
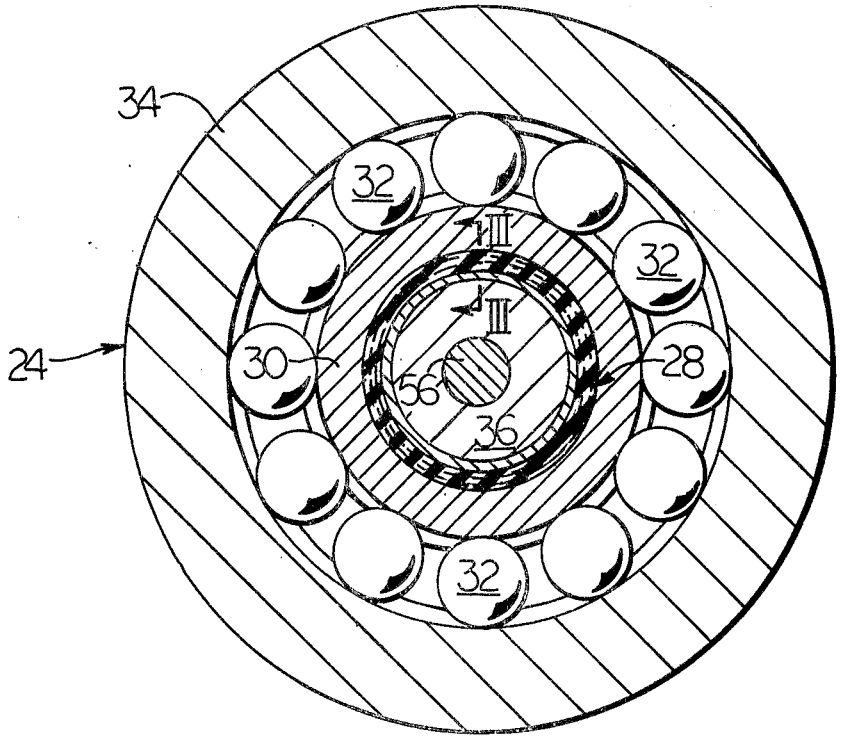

United States Defensive Publication [19] (H) [11] T981,004

McNeely et al. [43] Apr. 3, 1979

[54] RESILIENTLY MOUNTED WHEEL ASSEMBLY

[75] Inventors: Robert T. McNeely; Michael A. Roussin, both of Peoria, Ill.

[73] Assignee: Caterpillar Tractor Co., Peoria, Ill.

[21] Appl. No.: 894,676

[22] Filed: Apr. 10, 1978

[51] Int. Cl.[2] ..... F16C 27/06

[52] U.S. Cl. ..... 308/26; 187/95; 308/184 R

[57] ABSTRACT

A resiliently mounted wheel assembly has a tread ring, an annular member, a plurality of bearing elements for rotatably mounting the tread ring on the annular member, an elastomeric ring member resiliently supporting the annular member, and an arbor mount supporting the elastomeric ring member and being of a construction sufficient for movement of the annular member between two positions spaced a preselected axial distance apart and allowing the tread ring to self-alignably engage a surface.

2 Claims, 1 Sheet Drawing,

13 Pages Specification

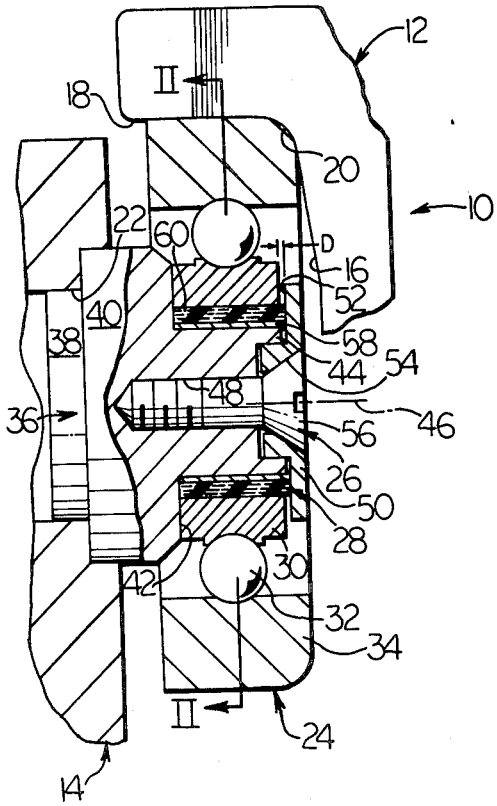

The file of this unexamined application may be inspected and copies thereof may be purchased (849 O.G. 1221, Apr. 9, 1968).